United States Patent
Oh et al.

(10) Patent No.: US 8,744,189 B2
(45) Date of Patent: Jun. 3, 2014

(54) CHARACTER REGION EXTRACTING APPARATUS AND METHOD USING CHARACTER STROKE WIDTH CALCULATION

(75) Inventors: Sang-Wook Oh, Ansan-si (KR); Sang-Hoon Sull, Seoul (KR); Myung-Hoon Kim, Seongnam-si (KR); Hoon-Jae Lee, Suwon-si (KR); Soon-Hong Jung, Seongnam-si (KR); Jun-Sic Youn, Ansan-si (KR)

(73) Assignees: Samsung Electronics Co., Ltd (KR); Korea University Research and Business Foundation (KR)

( * ) Notice: Subject to any disclaimer, the term of this patent is extended or adjusted under 35 U.S.C. 154(b) by 329 days.

(21) Appl. No.: 13/029,845

(22) Filed: Feb. 17, 2011

(65) Prior Publication Data

US 2011/0200257 A1 Aug. 18, 2011

(30) Foreign Application Priority Data

Feb. 17, 2010 (KR) ........................ 10-2010-0014280

(51) Int. Cl.
*G06K 9/00* (2006.01)

(52) U.S. Cl.
USPC ........... 382/187; 382/164; 382/195; 382/297; 382/177; 382/256

(58) Field of Classification Search
USPC .......... 382/187, 164, 195, 297, 177, 256, 305
See application file for complete search history.

(56) References Cited

U.S. PATENT DOCUMENTS

2002/0085758 A1* 7/2002 Ayshi et al. .................... 382/199
2009/0136136 A1 5/2009 Mori et al.

FOREIGN PATENT DOCUMENTS

| JP | 10-187886 | 7/1998 |
|----|-----------|--------|
| JP | 11-175659 | 7/1999 |
| KR | 1020070112454 | 11/2007 |
| KR | 1020080096263 | 10/2008 |

OTHER PUBLICATIONS

Su et al, "A novel stroke exaction method for Chinese characters using Gabor filters", Pattern Recognition, 36, pp. 635-647, 2003.*
Ariyoshi et al: the machine translated english version of JP10-187886, 1998.*
Dinh et al., "An Efficient Method for Text Detection in Video Based on Stroke Width Similarity", Department of Electronics and Computer Engineering, Korea University, 2007.

OTHER PUBLICATIONS

Srivastav et al., "Text Detection in Scene Images Using Stroke Width and Nearest-Neighbor Constraints", Indian Institute of Technology and Indian Institute of Science, 2008.

* cited by examiner

*Primary Examiner* — Ruiping Li
(74) *Attorney, Agent, or Firm* — The Farrell Law Firm, P.C.

(57) ABSTRACT

A character region extracting apparatus and method which extract a character region through the calculation of character stroke widths are provided. The method includes producing a binary image including a candidate character region from an original image; extracting a character outline from the candidate character region; acquires character outline information for the extracted outline; setting a representative character stroke width and a representative character angle in each of the pixels forming the outline, based on the character outline information; and determining a character existing region in the candidate character region by confirming the ratio of effective representative stroke widths and effective angles as compared to the entire length of the outline. Accordingly, it is possible to efficiently determine whether one or more characters exist in the candidate character region.

20 Claims, 8 Drawing Sheets
(1 of 8 Drawing Sheet(s) Filed in Color)

CHARACTER REGION EXTRACTING APPARATUS AND METHOD USING CHARACTER STROKE WIDTH CALCULATION

PRIORITY

This application claims priority under 35 U.S.C. §119(a) to an application entitled "Character Region Extracting Apparatus And Method Using Character Stroke Width Calculation" filed in the Korean Intellectual Property Office on Feb. 17, 2010 and assigned Serial No. 10-2010-0014280, the entire disclosure of which is incorporated herein by reference.

BACKGROUND OF THE INVENTION

1. Field of the Invention

The present invention generally relates to the detection of a character region in an image, and more particularly, to a character region extracting apparatus and method based on character stroke width calculation.

2. Description of the Related Art

Generally, a character extraction method recognizes a character included in an image, and extracts the recognized character region.

Characters existing in such an image provide various information items for the image. Therefore, research is being conducted in the area of applications and services for recognizing characters in an image and providing information related to the characters. For this purpose, it is first necessary is to detect a character-positioned region in such an image.

A character region is detected on the basis of edge, color and contrast characteristics, and it is confirmed whether the detected region actually contains one or more characters. For this purpose, character stroke widths are calculated, and the detected region is finally determined as a character region if the character stroke widths are constant. Considering the fact that character stroke widths are constant except for some fonts and sign boards, to which complicated designs are applied, the character stroke widths are used for detecting a character region.

As described above, in the past, character edge, color and contrast characteristics were used so as to detect a character region, in which case character stroke widths were calculated mainly along a scan line in an image region.

However, there was a problem in that a limitation exists in calculating correct character stroke widths since stroke widths may be erroneously calculated as the scan line passes positions of the characters or the characters themselves are inclined and, hence, the scan line does not pass one or more character strokes perpendicularly.

SUMMARY OF THE INVENTION

Accordingly, the present invention has been made to solve the above-mentioned problems occurring in the prior art, and the present invention provides a character region determining system and method by calculating correct character stroke widths for detecting a character region in an image.

In accordance with an aspect of the present invention, a character region extracting apparatus is provided, which extracts a character region through character stroke width calculation, the apparatus including a candidate character region detecting unit for producing a binary image including a candidate character region from an original image; an information acquisition unit for extracting a character outline from the candidate character region, and acquiring character outline information for the extracted outline; a character region information acquisition unit for setting a representative character stroke width and a representative character angle in each pixel forming the outline, on the basis of the character outline information; and a character region determining unit for determining a character existing region in the candidate character region by confirming the ratio of effective representative stroke widths and effective angles as compared to the entire length of the outline.

In accordance with another aspect of the present invention, a character region extracting method which extracts a character region through character stroke width calculation is provided, the method including producing a binary image including a candidate character region from an original image; extracting a character outline from the candidate character region; acquiring character outline information for the extracted outline; setting a representative character stroke width and a representative character angle in each pixel forming the outline, on the basis of the character outline information; and determining a character existing region in the candidate character region by confirming the ratio of effective representative stroke widths and effective angles as compared to the entire length of the outline.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the present invention will be more apparent from the following detailed description taken in conjunction with the accompanying drawings, in which:

FIGS. 7A to 7F illustrate examples for describing a process for setting a character stroke width and angle in each of the pixels of a character outline by the character region information acquisition unit in accordance with an embodiment of the present invention.

DETAILED DESCRIPTION OF EMBODIMENTS OF THE PRESENT INVENTION

Figure 1:
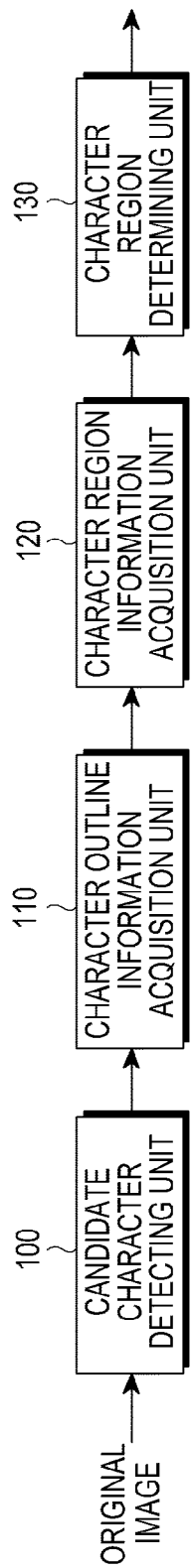
FIG. 1 illustrates a configuration of a character extracting apparatus in accordance with an embodiment of the present invention.

Hereinafter, embodiments of the present invention will be described with reference to the accompanying drawings. In the following description, the same elements will be designated by the same reference numerals although they are illustrated in different drawings. Further, various specific definitions found in the following description are provided only to help general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention rather unclear.

FIG. 1 illustrates a configuration of a character extracting apparatus in accordance with an embodiment of the present invention.

In the present embodiment, it is assumed that characters have a brightness value of 0.

A character extracting apparatus, in accordance with the present embodiment, includes a candidate character region detecting unit 100, a character outline information acquisition unit 110, a character region information acquisition unit 120, and a character region determining unit 130.

The candidate character region detecting unit 100 outputs a binary image including a candidate character region from an original image. The candidate character region refers to a region which is determined to be a character region.

The character outline information acquisition unit 110 extracts outlines of characters from the candidate character region in the binary image, and sets a vertical angle for each of the pixels forming the extracted outline.

Specifically, the character outline information acquisition unit 110 presets a comparison mask to be used for extracting outlines from a binary image. The comparison mask is then set as illustrated in FIG. 2A, wherein x in the comparison mask indicates a pixel which does not participate in the operation, and 0 indicates a pixel which participates in operation.

The character outline information acquisition unit 110 extracts outlines of a character region by comparing all of the pixels existing in a binary image with the comparison mask.

Figure 2A:
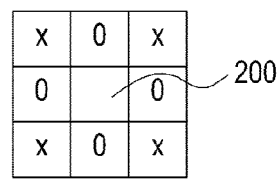
FIGS. 2A to 2F illustrate examples for describing a process for extracting a character outline, and setting character outline information for the extracted outline through a character outline information acquisition unit in accordance with an embodiment of the present invention.

That is, the character outline information acquisition unit 110 determines whether the brightness value of a specific pixel to be compared in a binary image is 0 by matching a reference pixel positioned at the center of the comparison mask as indicated by reference numeral 200 in FIG. 2A with the specific pixel, and if it is determined that the brightness value of the specific pixel is 0, the character outline information unit 110 determines whether the brightness value of the peripheral pixels positioned around the specific pixel is 0, which is equal to the brightness values of the peripheral pixels positioned around the reference pixel.

Figures 2B, 2C, 2D:
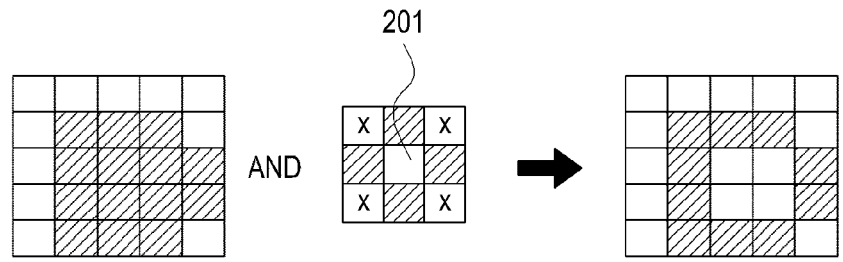

For example, when each of the pixels in a specific pixel region in a binary image as illustrated in FIG. 2A is compared with a comparison mask as illustrated in FIG. 2C, if pixel 201 is 0, and all of the pixels to the top, bottom, left and right of pixel 201 are 0, it is possible to extract an outline as illustrated in FIG. 2D.

As a result of the comparison, if the brightness value of peripheral pixels around the specific pixel is determined to be 0, the character outline information acquisition unit 110 changes the brightness value of the specific pixel matched with the reference pixel from 0 to 255.

After conducting the above-mentioned process to each pixel in the binary image, the character outline information acquisition unit 110 generates a binary image including a character outline.

The character outline information acquisition unit 110 then detects a vertical angle for each of the pixels forming the outline, and quantizes the detected angles to preset representative values.

Figure 2E:
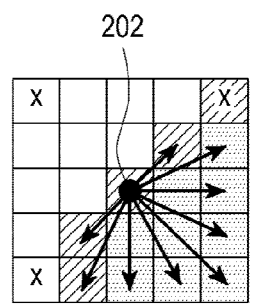

Specifically, the character outline information acquisition unit 110 sets a specific pixel on the outline as a reference pixel, and sets a block region with a predetermined size centering around the set reference pixel. The character outline information acquisition unit 110 then produces directional vectors between the reference pixel and pixels having a brightness value of 0 within the block as illustrated in FIG. 2E, and sets the vector value obtained by summing all of the produced directional vectors as the vertical angle of the reference pixel.

Figure 2F:
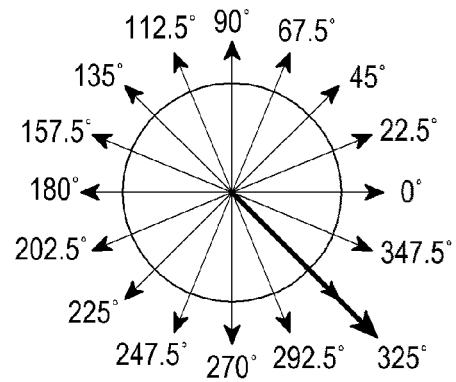

The character outline information acquisition unit 110 presets n representative angle values by equally dividing 360 degrees for quantization into n parts as illustrated in FIG. 2F, and determines which representative angle value's critical range includes the vertical angle set in the above-mentioned process, among the preset individual representative angle values. n is a predefined natural number and the discrimination ability of the vertical angle set depends on the number n. If n is too small, then the individual representative angle value becomes too large to discriminate the vertical angle set. If n is too large, then the individual representative angle value becomes too small to collect and represent the similar vertical angle sets. For example, FIG. 2F illustrates 16 representative angle values.

Thereafter, the character outline information acquisition unit 110 quantizes the set vertical angle to the representative angle value corresponding to the critical range in which the set vertical angle is included, and the character outline information acquisition unit 110 produces vectors for all of the pixels included in the character outline, and quantizes the vectors to the preset representative angles.

The character region information acquisition unit 120 sets a character stroke width and angle in each of the pixels forming the character outline, on the basis of the character outline information acquired from the character outline information acquisition unit 110. The character stroke width is a distance from a specific pixel to a pixel on the outline which is correspondingly positioned in the direction of the representative angle value of the specific pixel.

Specifically, the character region information acquisition unit 120 calculates a first character stroke width, which is a distance from a specific pixel to a pixel correspondingly positioned on the outline in the direction of the representative angle value corresponding to the specific pixel, among the pixels forming the outline, and second and third character stroke widths, which are the distances from the specific pixel to the pixels on the outline, which are correspondingly positioned in the directions of the representative angle values of each side of the representative angle value corresponding to the specific pixel, respectively.

The character region information acquisition unit sets the shortest stroke width among the calculated three character stroke widths as the character stroke width of the corresponding pixel, and sets the representative angle value corresponding to the set character stroke width as the angle value of the corresponding pixel.

The character region information acquisition unit 120 sets character stroke widths and angle values for all of the pixels forming the character outline through the above-mentioned actions.

The character region determining unit 130 determines whether a character actually exists in the candidate character regions. That is, the character region determining unit 130 determines whether any character exists by estimating the ratio of an effective character stroke width as compared to the entire length of the character outline.

The present invention can thus accurately calculate a character stroke width by setting the character stroke width and angle of each of the pixels forming the character outline, using the character outline and representative angle values, whereby the present invention can efficiently determine whether a character really exists in a candidate character region.

Figure 3:
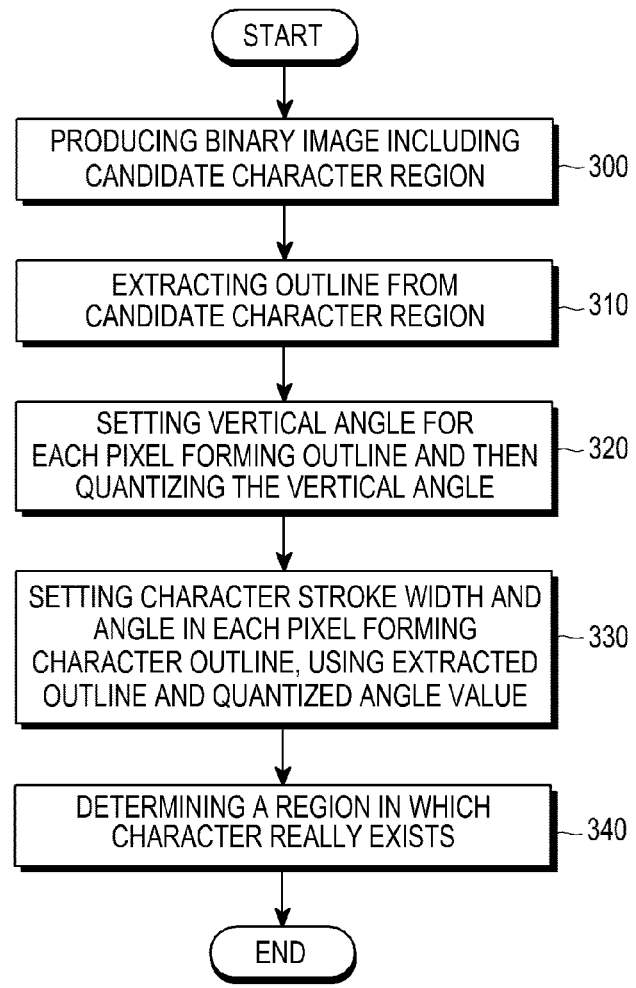
FIG. 3 is a flowchart illustrating a character extracting process by a character extracting apparatus in accordance with an embodiment of the present invention.

FIG. 3 is a flowchart illustrating a character extracting process by a character extracting apparatus in accordance with an embodiment of the present invention.

In step 300, the candidate character region detecting unit 100 produces a binary image including a candidate character region.

In step 310, the character outline information acquisition unit 110 extracts a character outline from the candidate character region. This will be described in more detail with reference to FIG. 4.

Figure 4:
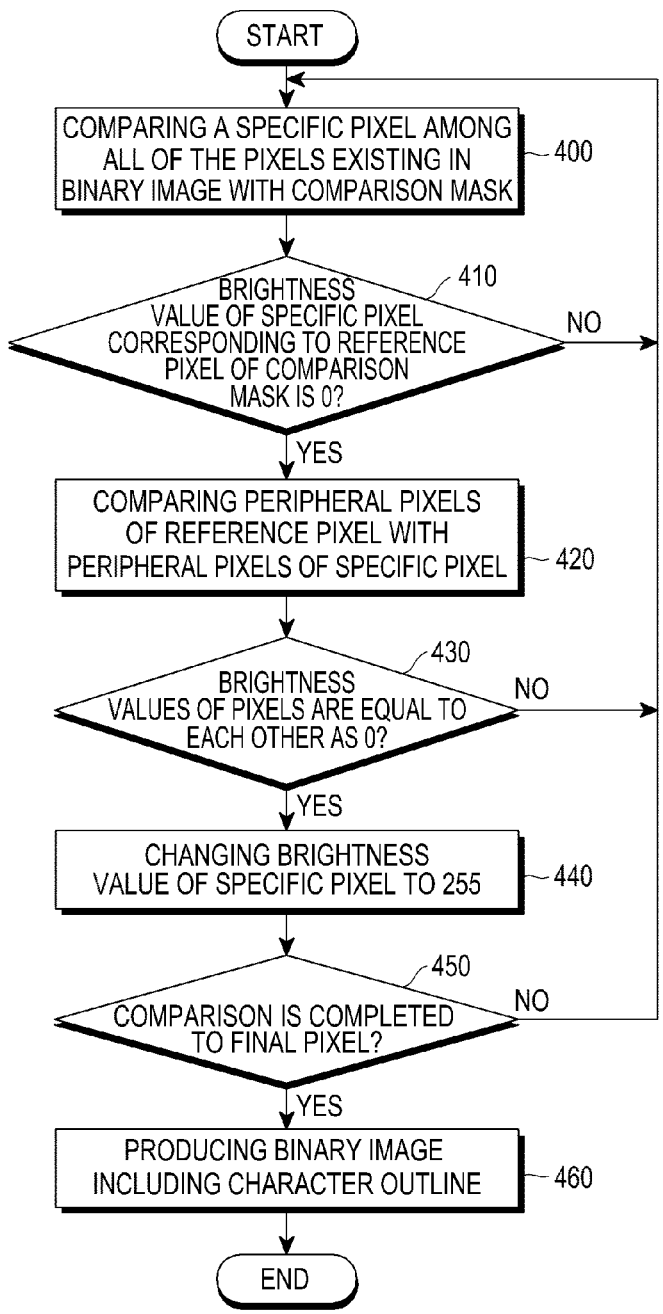
FIG. 4 is a flowchart illustrating a character outline extracting process by the character outline information acquisition unit in an embodiment of the present invention.

FIG. 4 is a flowchart illustrating a character outline extracting process by the character outline information acquisition unit in accordance with an embodiment of the present invention.

In the present invention, the brightness value of a character region is assumed to be 0.

In step 400, the character outline information acquisition unit 110 compares a specific pixel among all of the pixels existing in the binary image with a comparison mask. The comparison mask is a mask as illustrated in FIGS. 2A and 2C.

In step 410, the character outline information acquisition unit 110 determines whether the brightness value of a specific pixel corresponding to the reference pixel of the comparison mask is 0, wherein if it is determined that the brightness value is 0, the character outline information acquisition unit 110 proceeds to step 420, otherwise, the character outline information acquisition unit 110 returns to step 400 and continuously compares another specific pixel to the comparison mask.

In step 420, the character outline information acquisition unit 110 compares the peripheral pixels around the reference pixel with the peripheral pixels around the specific pixel. That is, the character outline information acquisition unit 110 determines whether the brightness values of the pixels positioned at the top, bottom, left and right of the reference pixel are 0 and the brightness values of the pixels positioned at the top, bottom, left and right of the specific pixel are 0.

The character outline information acquisition unit 110 determines whether the brightness values of the peripheral pixels are all equal to 0 in step 430, wherein if it is determined that the brightness values are equal to each other, the character outline information acquisition unit 110 proceeds to step 440, and if not, the character outline information acquisition unit 110 proceeds to step 400 and continuously compare another specific pixel with the comparison mask.

In step 440, the character outline information acquisition unit 110 changes the brightness value of the specific pixel to 255. Although it is described that the present invention changes the brightness value to 255 by way of an example, it is possible to change the brightness value to a preset brightness value or an optional brightness value. "Preset" means that a fixed value is used for any time and "optional" means that a temporarily determined value can be used for each time.

In step 450, the character outline information acquisition unit 110 confirms whether the comparison to the comparison mask has been completed, including the final pixel, wherein if it is determined that the comparison is completed, the character outline information acquisition unit 110 proceeds to step 460, otherwise, the character outline information acquisition unit 110 returns to step 400 and continuously compares another specific pixel with the comparison mask.

In step 460, the character outline information acquisition unit 110 produces a binary image including a character outline.

Thereafter, returning to step 320, the character outline information acquisition unit 110 sets and quantizes vertical angles for individual pixels forming the character outline. This will be described in detail with reference to FIG. 5.

Figure 5:
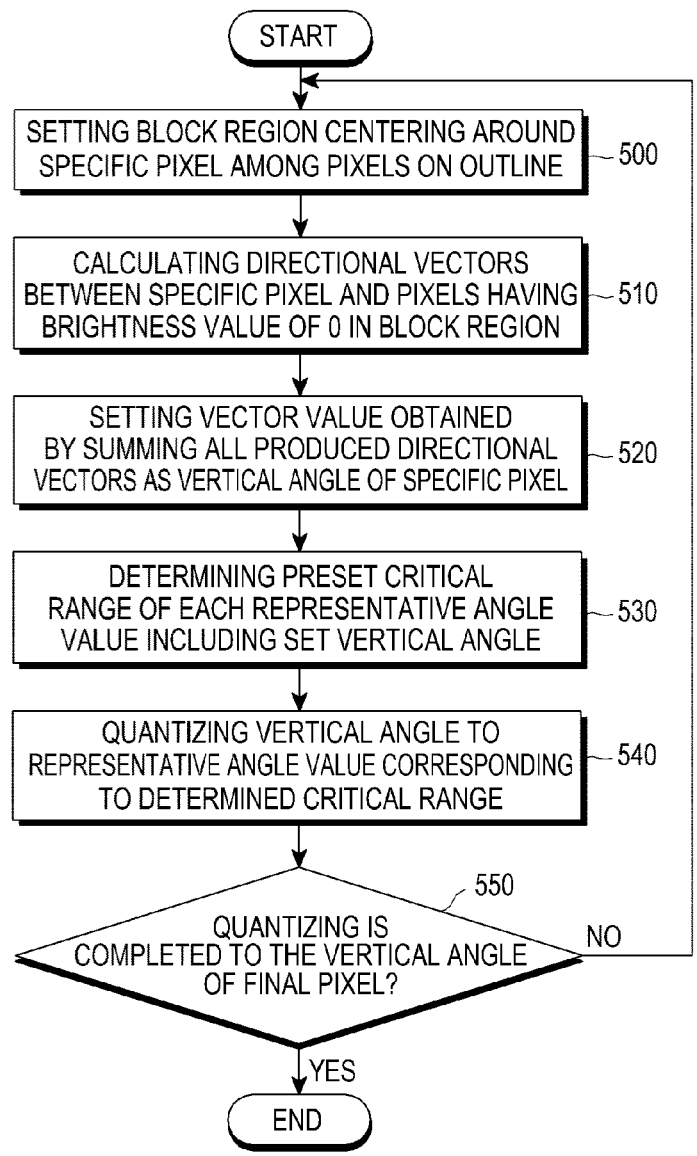
FIG. 5 is a flowchart illustrating a vertical angle quantizing process for the pixels of a character outline by the character outline information acquisition unit in accordance with an embodiment of the present invention.

FIG. 5 is a flowchart illustrating a vertical angle quantizing process for the pixels of a character outline by the character outline information acquisition unit in accordance with an embodiment of the present invention.

In step 500, the character outline information acquisition unit 110 sets a block region of a predetermined size centering around a specific pixel among the pixels of a character outline.

In step 510, the character outline information acquisition unit 110 produces directional vectors between the specific pixel and the pixels having a brightness value of 0 in the block region. Although the present invention is described with the assumption that the brightness value is 0, the brightness value may be set by a user or a preset brightness value may be used as the brightness value.

In step 520, the character outline information acquisition unit 110 sets the vector value obtained by summing all of the produced directional vectors as the vertical angle of the specific pixel. As described above, the character outline information acquisition unit 110 may produce directional vectors between the pixel indicated by reference numeral 202 of FIG. 2E and the other pixels having a brightness value of 0, and calculate the vertical angle by summing the produced directional vectors.

In step 530, the character outline information acquisition unit 110 determines a critical range for each of preset representative angles in which the set vertical angle is included. In step 540, the character outline information acquisition unit quantizes the vertical angle to a representative angle value of a confirmed critical range.

For example, assuming that a representative angle value is quantized to 45° when the critical range of a vertical angle is 28° to 53°, if the calculated vertical angle is 47.5°, the character outline information acquisition unit 110 confirms which critical range includes the calculated vertical angle, 47.5°, and quantizes the calculated vertical angle to 45°.

In step 550, the character outline information acquisition unit 110 determines whether quantization of the vertical angles of all pixels has been completed, wherein if it is determined that the quantization is completed, the character outline information acquisition unit 110 terminates its operation, otherwise, the character outline information acquisition unit 110 returns to step 500 and executes steps 510 to 550.

Returning to step 330 in FIG. 3, the character region information acquisition unit 120 sets a character stroke width and angle in each of the pixels forming a character outline, on the basis of the extracted and quantized angle values in step 330. This will be described in more detail with reference to FIG. 6.

Figure 6:
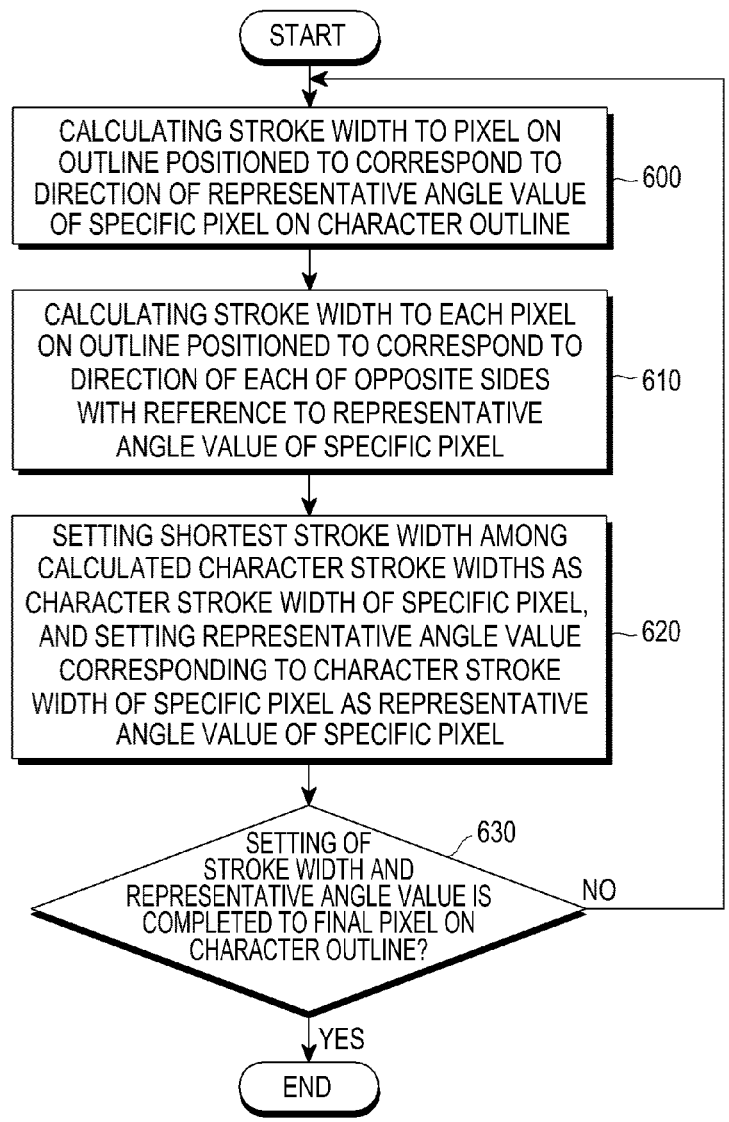
FIG. 6 is a flowchart illustrating a process for setting a character stroke width and angle in each of the pixels of a character outline through a character region information acquisition unit in accordance with an embodiment of the present invention.

FIG. 6 is a flowchart illustrating a process in which the character region information acquisition unit sets a character stroke width and angle in each of the pixels forming a character outline in accordance with an embodiment of the present invention.

In step 600, the character region information acquisition unit 120 calculates a stroke width from a specific pixel to a pixel on the character outline, which is correspondingly positioned in the direction of the representative angle value of the specific pixel. The stroke width is a distance to the closest pixel among the pixels positioned in the direction of the representative angle direction with reference to a specific pixel to be used for calculating a stroke width.

In step 610, the character region information acquisition unit 120 calculates a stroke width of each of pixels on the outline, which are correspondingly positioned in the directions of the representative angle values on each side of the representative angle value of the specific pixel, respectively.

Figures 7A, 7B, 7C, 7D, 7E, 7F:
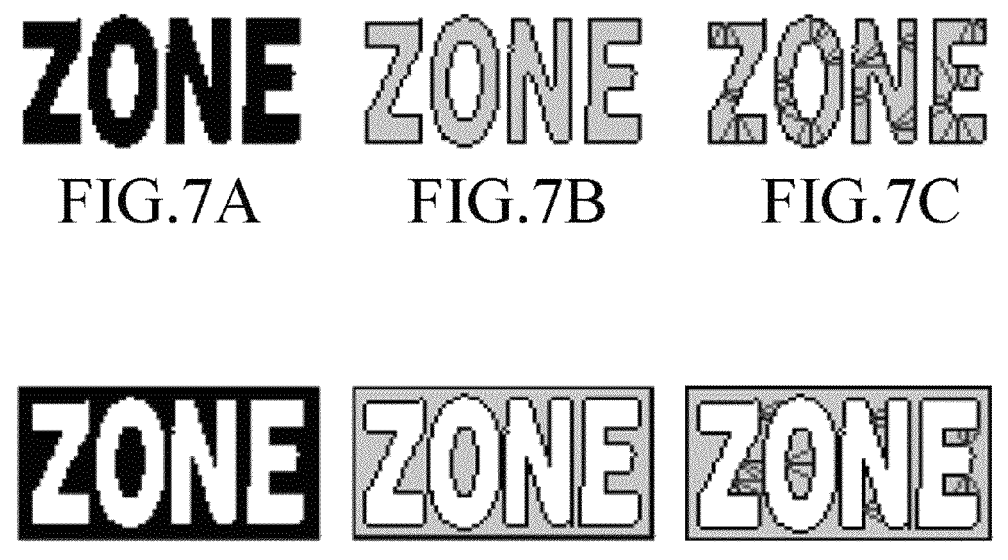

For example, if a candidate character region in an original image is binarized, two reversed images as illustrated in FIGS. 7A and 7D are produced, wherein, since the characters may be light or dark as compared to the background, the character region information calculates character stroke widths for the two image modes.

That is, the character region information acquisition unit 120 extracts character outlines as illustrated in FIGS. 7B and 7E from the binary images as illustrated in FIGS. 7A and 7D, and calculates stroke widths in three angle directions within the strokes as illustrated in FIGS. 7C and 7F from the extracted outlines.

For example, in the past, since a vertical stroke width calculated from a character, such as "O," "S," or "Z" may not be selected as the shortest distance, it was difficult to measure a correct stroke width. However, if three directions are used as in the present invention, it is possible to measure the shortest stroke width of a character, such as "O," "S" or "Z."

If a stroke width is measured using the above-mentioned method, a vertically or horizontally extended stroke width may be measured in a character, such as "1" or "-." In such a case, the character region information acquisition unit 120 compares such a stroke width with the size of the corresponding candidate character region, and excludes the stroke width from stroke widths if the stroke width is larger than the size of the candidate character region.

In step 620, the character region information acquisition unit 120 sets the shortest stroke width among the calculated character stroke widths as the character stroke width of a specific pixel, and sets a representative angle value corresponding to the shortest stroke width as the representative angle of the specific pixel.

In step 630, the character region information acquisition unit 120 confirms whether the setting of a stroke width and a representative angle value is completed to all pixels on a character outline, wherein if it is determined that the setting is completed, the character region information acquisition unit 120 terminates its operation, otherwise, the character region information acquisition unit 120 returns to step 600, executing the stroke width calculation step, and executes steps 610 to 630.

Returning to FIG. 3 again, the character region determining unit 130 determines a region in which at least one character actually exists among the candidate character regions in step 340.

Specifically, the character region determining unit 130 determines whether a character exists by estimating not only the ratio of an effective stroke width as compared to the entire length of a character outline, but also the angle information existing ratio, thereby determining whether at least one character exists.

Generally, there are areas where stroke width values are constantly maintained, and areas where stroke width values are abruptly varied. Although the ratio of the entire outline occupied by the constant stroke width value areas is high when at least one character exists, such a constant stroke width value area exists even in the case of a non-character object.

Assuming that a character is a combination of strokes having a constant width, the strokes may be defined as one line having a certain direction. That is, a character having one or more strokes frequently includes areas in which the angles of its outline are constant as illustrated in FIG. 8B.

Figure 8A:
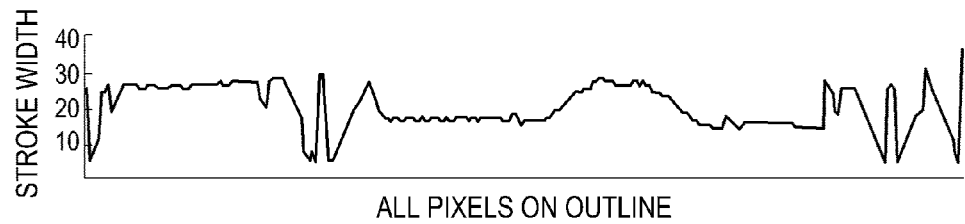
FIGS. 8A to 8C illustrate examples for describing a process for determining a character region in a candidate character region by the character extracting unit in accordance with an embodiment of the present invention.
Figure 8B:
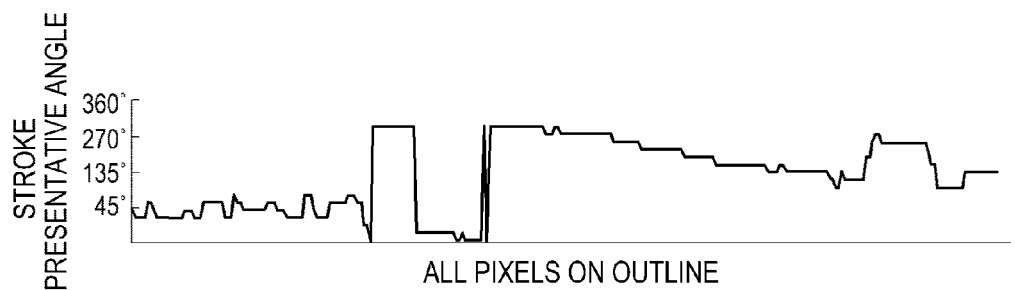
Figure 8C:
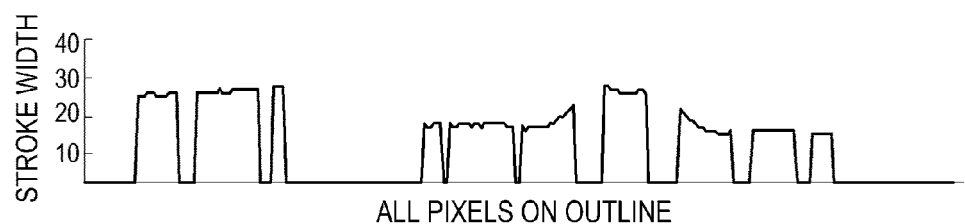

Therefore, the present invention does not determine whether a character exists on the basis of only effective stroke widths, but the present invention leaves effective strokes only as illustrated in FIG. 8C, using angle information together with the effective stroke widths as illustrated in FIG. 8B, and then determines whether a character exists on the basis of the remaining effective strokes.

Specifically, the character region determining unit 130 detects areas where constant angles are illustrated in the entirety of the outline as illustrated in FIG. 8B.

The character region determining unit 130 redefines stroke widths as 0, wherein the redefined stroke widths are those left by excluding only the areas where stroke widths are constant within a tolerance which is a ±1 pixel range as illustrated in FIG. 8A and the difference between the longest stroke width and the shortest stroke width within a detected area is not more than the half of the length of the area. The re-defined result may be indicated as illustrated in FIG. 8C.

Thereafter, for a region in which only the effective stroke widths are left, the character region determining unit 130 determines the region as an effective region if the ratio between the length of the effective stroke width area in the region and the length of the entire outline is not less than a preset ratio.

As described above, the present invention can precisely calculate character stroke widths and effectively determine where a character exists in a candidate character region by setting a character stroke width and angle of each of the pixels forming a character outline on the basis of the character outline and quantized representative values.

While the present invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A character region extracting apparatus which extracts a character region through character stroke width calculation, the character region extracting apparatus comprising:
    a candidate character region detecting unit for producing a binary image including a candidate character region from an original image;
    a character outline information acquisition unit for extracting a character outline from the candidate character region, and acquiring character outline information for the extracted outline;
    a character region information acquisition unit for setting a representative character stroke width and a representative character angle in each pixel forming the outline, on the basis of the character outline information; and a character region determining unit for determining a character existing region in the candidate character region by detecting a first area of pixels in the outline where the representative character angle varies within a first tolerance, detecting a second area of pixels within the detected first area where the representative character stroke width varies within a second tolerance, and determining the detected second area is the character existing region if the ratio of the length of the detected second area to the entire length of the outline is not less than a preset ratio, wherein the representative character stroke width is a shortest stroke width among a plurality of stroke widths from a specific pixel to a pixel on the character outline, and wherein the representative character angle is an angle corresponding to the representative character stroke.

2. The character region extracting apparatus of claim 1, wherein the character outline information acquisition unit extracts the outline by comparing all pixels in the binary image with a preset comparison mask, and converting the brightness value of the pixels satisfying comparison requirements to a preset first brightness value.

3. The character region extracting apparatus of claim 2, wherein when each of the pixels in the binary image is matched with a reference pixel positioned at the center of the comparison mask, the character outline information acquisition unit determines that the comparison requirements are satisfied if the brightness value of a pixel corresponding to the reference pixel has a preset second brightness value, and if the brightness value for pixels around the pixel corresponding to the reference pixel is equal to the brightness value of the pixels around the reference pixel.

4. The character region extracting apparatus of claim 3, wherein the character outline information acquisition unit sets a vertical angle for each of the pixels forming the extracted outline, and quantizes the vertical angle to a preset representative angle value.

5. The character region extracting apparatus of claim 4, wherein the character outline information acquisition unit sets a block region having a predetermined size centering around a pixel on the outline, produces directional vectors between the pixel on the outline and peripheral pixels around the pixel on the outline within the set block region, and sets a vector value obtained by summing the produced directional vectors as the vertical angle.

6. The character region extracting apparatus of claim 5, wherein the character region information acquisition unit calculates, for a given pixel, a first character stroke width which is a distance from the given pixel in the direction of a representative angle value to a first pixel on another side of the outline, a second character stroke width which is a distance from the given pixel in a first angle direction with reference to the representative angle value to a second pixel on another side of the outline, and a third character stroke width which is a distance from the given pixel in a second angle direction with reference to the representative value to a third pixel on another side of the outline, the character region information acquisition unit sets the shortest character stroke width among the first, second and third character stroke widths as the representative character stroke width, and the character region information acquiring distance sets a representative angle value corresponding to the set representative character stroke width as the representative character angle.

7. A character region extracting method which extracts a character region through character stroke width calculation, the method comprising the steps of:

producing a binary image including a candidate character region from an original image;

extracting a character outline from the candidate character region;

acquiring character outline information for the extracted outline;

setting a representative character stroke width and a representative character angle in each pixel forming the outline, on the basis of the character outline information; and determining a character existing region in the candidate character region by detecting a first area of pixels in the outline where the representative character angle varies within a first tolerance, within the detected first area, detecting a second area of pixels where the representative character stroke width varies within a second tolerance, and determining the detected second area is the character existing region if the ratio of the length of the detected second area to the entire length of the outline is not less than a preset ratio, wherein the representative character stroke width is a shortest stroke width among a plurality of stroke widths from a specific pixel to a pixel on the character outline, and wherein the representative character angle is an angle corresponding to the representative character stroke.

8. The character region extracting method of claim 7, wherein extracting the outline comprises:

comparing all of the pixels in the binary image with a preset comparison mask; and converting the brightness value of the pixels satisfying comparison requirements to a preset first brightness value.

9. The character region extracting method of claim 8, wherein comparing all of the pixels in the binary image with the preset comparison mask comprises:

matching each of the pixels in the binary image with the reference pixel positioned at the center of the comparison mask; and determining whether the brightness value of a pixel corresponding to a reference pixel has a preset second brightness value, and whether the brightness value for the pixels around the pixel corresponding to the reference pixel is equal to the brightness value of the pixels around the reference pixel.

10. The character region extracting method of claim 9, wherein acquiring the character outline information comprises:

setting a vertical angle for each of the pixels forming the extracted outline; and quantizing the vertical angle to a preset representative angle value.

11. The character region extracting method of claim 10, further comprising:

setting a block region having a predetermined size centering around a pixel on the outline;

calculating directional vectors between the pixel on the outline and peripheral pixels around the pixel within the set block region; and setting a vector value obtained by summing the produced directional vectors as the vertical angle.

12. The character region extracting method of claim 11, wherein quantizing the vertical angle comprises:

calculating, for a given pixel, a first character stroke width which is a distance from the given pixel in the direction of a representative angle value to a first pixel on another side of the outline, a second character stroke width which is a distance from the given pixel in a first angle direction with reference to the representative angle value to a second pixel on another side of the outline, and a third character stroke width which is a distance from the given pixel in a second angle direction with reference to the representative value to a third pixel on another side of the outline;

setting the shortest character stroke width among the first, second and third character stroke widths as the representative character stroke width; and setting a representative angle value corresponding to the set representative character stroke width as the representative character angle.

13. The character region extracting apparatus of claim 1, wherein the first tolerance is substantially equal to zero, and the first area of pixels in the outline is an area where the representative character angle remains substantially constant.

14. The character region extracting method of claim 7, wherein the first tolerance is substantially equal to zero, and the first area of pixels in the outline is an area where the representative character angle remains substantially constant.

15. The character region extracting apparatus of claim 1, wherein the second tolerance is substantially equal to 1 pixel, and the second area of pixels within the first area is an area where the representative character stroke width remains substantially constant.

16. The character region extracting method of claim 7, wherein the second tolerance is substantially equal to 1 pixel, and the second area of pixels within the first area is an area where the representative character stroke width remains substantially constant.

17. The character region extracting apparatus of claim 1, wherein the character region determining unit determines a character existing region in the candidate character region by further eliminating the detected second area as a character existing region if the difference between the longest representative stroke width and the shortest representative stroke width in the detected second area is more than a second preset ratio.

18. The character region extracting apparatus of claim 17, wherein the second preset ratio is substantially equal to half the length of the detected second area.

19. The character region extracting method of claim 7, wherein the step of determining a character existing region in the candidate character region further comprises:

eliminating the detected second area as a character existing region if the difference between the longest representative stroke width and the shortest representative stroke width in the detected second area is more than a second preset ratio.

20. The character region extracting method of claim 19, wherein the second preset ratio is substantially equal to half the length of the detected second area.

\* \* \* \* \*